United States Patent [19]
Garrison

[11] 3,924,447
[45] Dec. 9, 1975

[54] SLUMP INDICATOR

[76] Inventor: Eldon Garrison, 109 SE. 51st St., Oklahoma City, Okla. 73129

[22] Filed: Dec. 19, 1974

[21] Appl. No.: 534,306

[52] U.S. Cl................................. 73/54; 116/136.5
[51] Int. Cl.² ................. G01N 11/00; G01N 33/38; G01D 13/22
[58] Field of Search.......... 73/54; 116/136.5, 129 R, 116/114 R; 324/154 PB

[56] References Cited
UNITED STATES PATENTS

| | | | |
|---|---|---|---|
| 2,409,014 | 10/1946 | Bohmer et al. | 73/54 |
| 2,630,706 | 3/1953 | Maxon, Jr. | 73/54 |
| 2,821,079 | 1/1958 | Kerridge | 73/54 |
| 3,403,546 | 10/1968 | Stratton | 73/54 |

Primary Examiner—Richard C. Queisser
Assistant Examiner—Joseph W. Roskos
Attorney, Agent, or Firm—Imirie, Smiley, & Linn

[57] ABSTRACT

A slump indicator which provides continuous, precise indications of the mix consistency or slump of wet concrete in a drum-type mixing apparatus includes a generally flat base plate for attachment to the exterior side surface of the drum, a shaft rotatably attached to the base plate and extending into the drum, a paddle mounted on the end of the shaft for movement by the wet mix, an indicator assembly including a pointer cooperating with a scale on the base plate, and a spring biasing the pointer to a neutral position and resisting the rotation of the shaft during operation.

10 Claims, 6 Drawing Figures

SLUMP INDICATOR

BACKGROUND OF THE INVENTION

1. Field of the Invention

The present invention relates generally to indicator devices, and more particularly, to a slump indicator for use in connection with drum-type concrete mixers.

2. Description of the Prior Art

The wetness or dryness of certain mixed materials may be a critical indicator of the quality of such materials when actually used. Wet mixed concrete is such a material, and the quality of concrete being delivered to an on-site construction project is extremely important. For this reason, concrete mix being delivered to a construction site is subject to frequent periodic inspection and measurement and must comply with stringent standards.

In the past, it has been the general practice to take frequent samples of delivered wet concrete mix at the site and to separately test each of these samples to ascertain whether the mix consistency is proper. While this approach ultimately provides an accurate determination of the consistency of the load being delivered, it has a number of drawbacks. For one, the load is only sampled for measurement and cannot be continuously monitored during the mixing process. Also, only those batches subject to test can be used with certainty that they are properly mixed, and numerous untested and possibly improperly mixed batches can be detrimentally used.

In an effort to overcome these problems, a number of indicator devices have been designed for providing continuous measurement of concrete slump.

Exemplary of such prior art approaches are those disclosed in U.S. Pat. Nos. 2,409,014, 3,403,546, 3,631,712; and 3,640,121. These prior art devices have generally served the purpose, but typically exhibit other drawbacks such as their overall complexity, the tendency of some structures to become clogged or obstructed during use, and the inconvenience and difficulty in installing such devices in pre-existing drum mixers. Accordingly, while the problems associated with providing a convenient slump indicator have been long known, a practical and acceptable solution has heretofore been unavailable.

SUMMARY OF THE INVENTION

It is, therefore, an object of the present invention to continuously monitor the mix consistency of concrete mixed in a drum-type mixer.

It is another object of this invention to construct a slump indicator having few parts, being of simple design, requiring minimal maintenance, and easily installed on existing drum-type mixers.

The present invention is summarized in that a slump indicator includes a generally flat base plate, a shaft rotatable on the base plate and protruding into the drum of a mixer, a paddle carried on the end of the shaft for movement by the concrete mix, an indicator on the shaft for cooperation with a graduated scale on the base plate, and a spring biasing the indicator to a neutral position and resisting the rotational forces experienced by the paddle.

This invention exhibits numerous advantages in that it is inexpensive to construct, can be quickly installed on existing drum mixers, provides accurate and continuous indications of mix consistency regardless of the direction of rotation of the drum, and may be readily and conveniently calibrated and adjusted prior to or during use.

These and other objects and advantages of the present invention will become apparent from the following description of a preferred embodiment when taken in conjunction with the accompanying drawings.

DESCRIPTION OF THE PREFERRED EMBODIMENT

Figure 1:
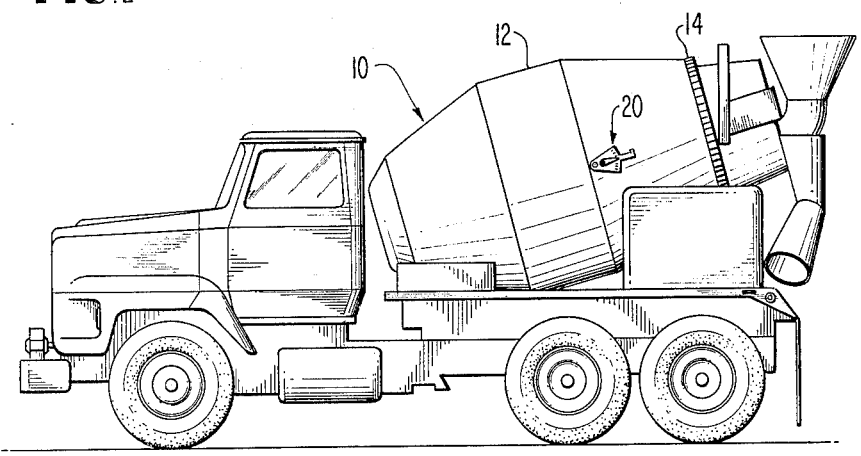
FIG. 1 is a side elevational view of a drum-type concrete mixing truck having a slump indicator in accordance with the present invention installed thereon.

The present invention is embodied in a drum-type concrete mixer 10 which may be mounted in any suitable manner, such as on a stand or on the bed of a truck or other vehicle, as shown in FIG. 1. The mixer includes a drum 12 journalled at each end for rotation about its longitudinal axis. The drum 12 is driven under power derived from the vehicle engine and coupled through an appropriate gear assembly to an annular gear ring 14, fixedly secured about the back end of the drum.

Figure 5:
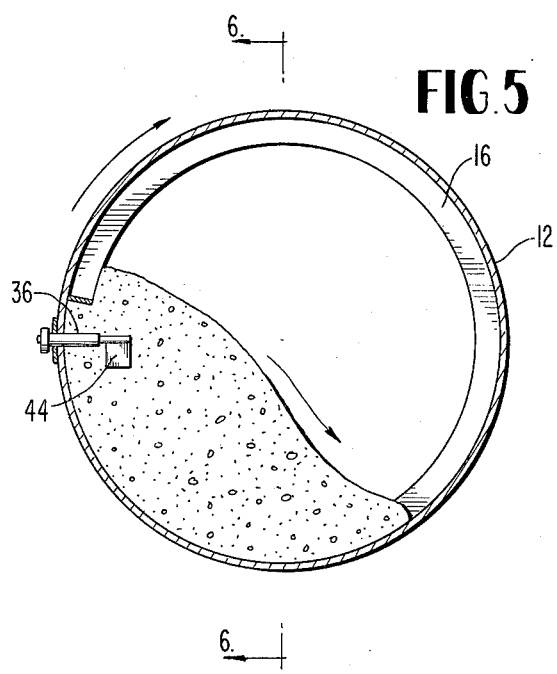
FIG. 5 is sectional view taken along the axis of rotation of the drum of FIG. 1.
Figure 6:
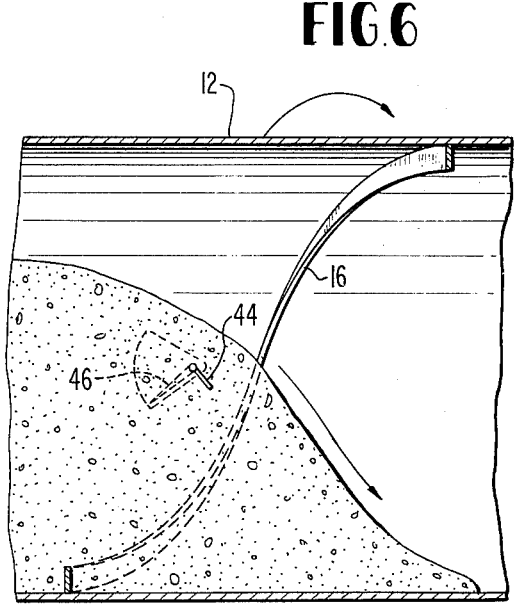
FIG. 6 is a sectional view taken along line 6—6 of FIG. 5.

The interior of the drum 12 is equipped with conventional spiral blades 16, FIGS. 5 and 6, for agitating the mix, consisting of aggregate, cement, and water. Generally, as the drum 12 is rotated, the blades 16 react with the mix and cause the mixture to advance generally from one end of the drum to the other and cascade or flow over onto itself. Mixers of this general type are conventional and well known and various additional structural details of both the mixer itself and the stand or vehicle for its support will not be presented for the sake of brevity.

Figure 4:
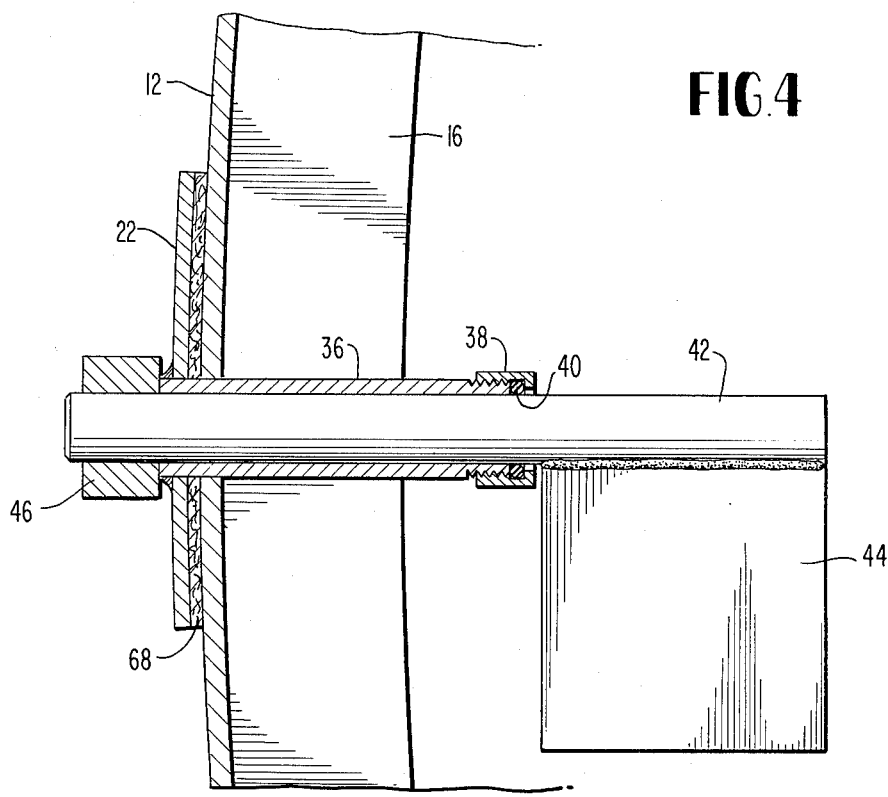
FIG. 4 is a sectional view taken along line 4—4 of FIG. 2.

The slump indicator 20 according to the present invention is designed to be mounted to the side of drum 12 as shown in FIG. 1. The indicator includes a generally flat base plate 22 which may take any suitable configuration but is preferably in the form of a pie-shaped sector. As best shown in FIG. 4, base plate 22 is slightly curved in order to match the curvature of the exterior surface of drum 12 and is provided with a graduated scale 24 suitably imprinted along the arcuate edge of the sector.

Figure 2:
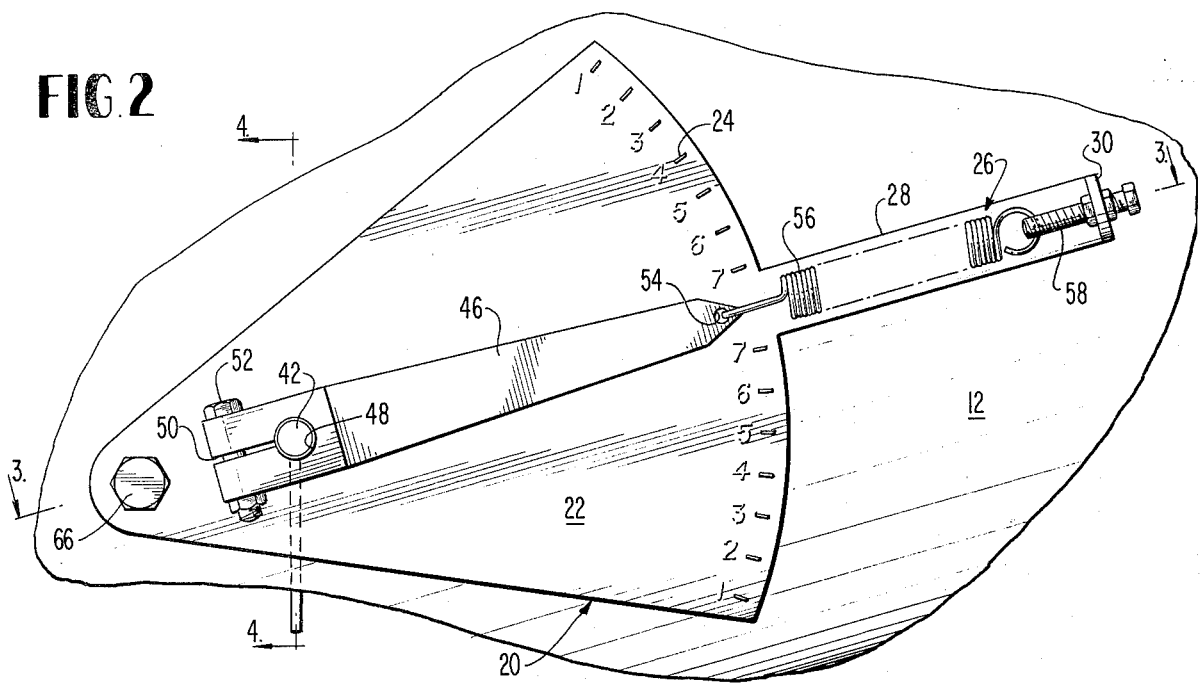
FIG. 2 is an exterior plan view of the slump indicator of FIG. 1.

A generally L-shaped arm 26 has a long leg 28 and a short leg 30 disposed normal thereto. Bracket 26 is attached to the base plate 22 by leg 28 which extends from a midpoint of the arcuate edge along a line intersecting the apex of the base plate 22. Leg 28 is disposed in the plane of the base plate 22 with shorter leg 30 protruding upwardly as visualized in FIG. 2. It is noted that the arm or bracket 26 including legs 28 and 30 may be formed as a separate member or may be provided as an integral extension of base plate 22, as desired.

First and second holes 32 and 34, respectively, are provided through base plate 22 along a line bisecting the pie-shaped sector. Hole 32 is disposed immediately adjacent the apex of the sector to facilitate mounting of the indicator as will be more fully described below. Hole 34 is slightly spaced from hole 32, and a generally cylindrical sleeve 36 is fixedly secured to the base plate in hole 34 by any suitable means such as welding. The end of sleeve 36 farthest from plate 22 has an external thread for cooperation with a cap nut 38. Cap nut 38 cooperates with the end of sleeve 36 to compressively capture a resilient, O-ring seal 40 which provides a fluid-tight seal with a cylindrical shaft 42 extending through sleeve 36 from the opposite side of base plate 22.

A substantially flat paddle element 44 is secured along an edge thereof to the peripheral surface of shaft 42. Paddle 44 is aligned along the axis of shaft 44 and reacts with the cement mix in the drum to cause shaft 42 to rotate within sleeve 36.

An elongated pointer element 46 has an aperture 48 formed through one end thereof for receiving the end of shaft 42. The portion of the pointer element 46 between the aperture 48 and the end wall is split to form a slight gap 50, and a bolt 52 extends transversely through the gap 50 to clamp the pointer about shaft 42. The opposite end of the pointer element 46 has a hole 54 therethrough for receiving one end of a tension spring 56 mounted at its other end on an adjustment bolt 58 carried by leg 30.

Figure 3:
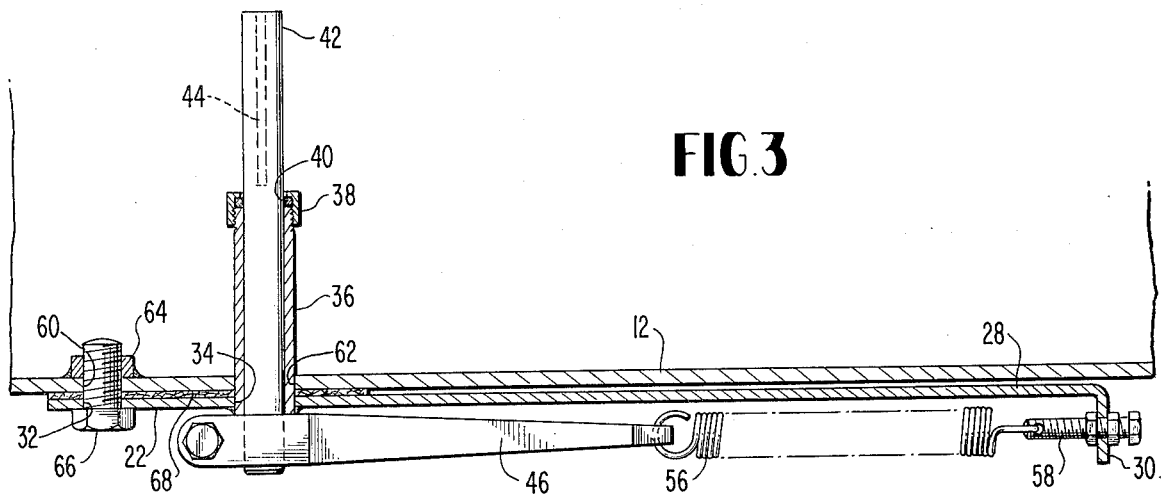
FIG. 3 is a sectional view taken along line 3—3 of FIG. 2.

As shown in FIG. 3, the slump indicator is mounted to the side wall of drum 12 which has first been prepared by drilling two holes 60 and 62 therethrough. A nut 64 is preferably welded to the inside wall of drum 12 over hole 60. With the cap nut 38 and shaft 42 removed, the base plate assembly with sleeve 36 is positioned against the drum wall with sleeve 36 extending through hole 62 and hole 32 lined up with hole 60 in the drum wall. A bolt 66 is threadedly received in nut 64 to hold the base plate 22 securely in place, and a gasket or spacing element 68, constructed of suitable materials such as felt, cork, rubber or the like, may be interposed between the base plate 22 and the wall of drum 12 if desired.

After the base plate and sleeve subassembly have been installed as noted above, cap nut 38, seal 40, and shaft 42 are then installed from inside the drum 12. With the shaft properly in position, the pointer 46 is mounted on the end of the shaft and bolt 52 is tightened to clamp the indicator to the shaft.

Referring to FIGS. 5 and 6, in operation, as the drum 12 is rotated and the concrete mix contained therein is agitated, the mix will flow longitudinally through the drum because of the spiral blades 16. As the mix is agitated in this manner, paddle 44 will be moved so as to cause shaft 42 to rotate within sleeve 36. Since the pointer element 46 is rigidly secured to the outer end of shaft 42, and is biased to a neutral position by the tension spring 56, a resistance to shaft rotation is established which is proportionately greater the more shaft 42 is turned from its neutral position. Thus, the degree of rotation of shaft 42, and thus the movement of indicator 46, is directly and proportionately related to the force applied against paddle 44 by the mix.

It has been found that the force applied against paddle 44 bears a direct relationship to the consistency of the concrete mixture and is therefore a good indication of the concrete slump. Thus, by appropriately adjusting the angular position of paddle 44 with respect to the indicator 46 in its neutral position, and by adjusting bolt 58 to regulate the tension on spring 56, the slump indicator of the present invention can be precisely calibrated to afford a direct and continuous indication of the slump of the concrete mix in the drum 12.

It can be appreciated from the foregoing that the present invention is extremely simple to manufacture and maintain, and has few parts subject to wear or replacement. In addition, sleeve 36 protects nearly the entire length of shaft 42 and provides reinforcement to protect the shaft assembly from damage by the concrete mix. In addition, the present invention may be easily installed in existing drum mixers by merely forming the two necessary holes in the wall of the drum and positioning the unit in place. The slump indicator of the present invention therefore exhibits numerous improved characteristics over similar prior art devices, while at the same time being simpler, more economical, and more reliable.

Inasmuch as the present invention is subject to many variations, modifications and changes in detail, it is intended that all matter contained in the foregoing description or shown in the accompanying drawings shall be interpreted as being illustrative and not in a limiting sense.

What is claimed is:

1. A slump indicator for a rotatable drum concrete mixer comprising:
    a generally flat base plate adapted for exterior attachment to a side wall of said drum;
    shaft means carried by said base plate for rotation about an axis normal to the plane of said base plate along a radius of said drum, said shaft having first and second portions protruding on either side of said plate for disposition interiorly and exteriorly of the drum, respectively;
    a paddle attached along an edge to the end of said first portion of said shaft for sweeping an arcuate path about said shaft axis, said paddle being arranged in the path of movement of the concrete mix in said drum to effect rotation of said shaft;
    indicator means in the form of a pointer attached to said second portion of said shaft, said pointer cooperating with a graduated scale on said base plate; and
    a spring connecting the tip of said pointer to said base plate to bias said pointer to a neutral position and to present a proportionately increasing resistance to rotation of said shaft by said paddle in either direction from said neutral position.

2. A slump indicator as recited in claim 1 wherein said paddle is flat and is rigidly attached along an edge to said shaft.

3. A slump indicator as recited in claim 1 further including a sleeve rigidly attached to the interior side of said base plate and receiving a portion of said shaft for rotation therein.

4. A slump indicator as recited in claim 3 wherein a ring seal is disposed about said shaft adjacent the distal end of said sleeve, and a cap nut is threadedly secured to said sleeve end for cooperation with said seal.

5. A slump indicator as recited in claim 3 wherein said sleeve surrounds the entire part of the first portion of said shaft between said paddle and said base plate to support and protect the shaft from damage.

6. A slump indicator as recited in claim 1 wherein said base plate is generally pie-shaped with said shaft disposed adjacent the apex thereof and said graduated scale running along the opposite arcuate edge.

7. A slump indicator as recited in claim 1 wherein said base plate is attached to said drum by a single threaded fastener adjacent said shaft.

8. A slump indicator as recited in claim 7 wherein a felt gasket is disposed between said base plate and said drum.

9. A slump indicator as recited in claim 1 wherein said base plate is slightly curved to conform to the curvature of the exterior surface of the drum.

10. A slump indicator as recited in claim 1 including a substantially L-shaped arm having a short leg and a long leg, said long leg of said arm being fixedly attached to said base plate and extending in the plane thereof along a line intersecting said shaft axis; and further including an adjustment bolt threadedly carried by said short leg, said spring being mounted in tension between the tip of said pointer and an end of said adjustment bolt.

* * * * *